(12) United States Patent
Shi

(10) Patent No.: US 6,438,524 B1
(45) Date of Patent: Aug. 20, 2002

(54) METHOD AND APPARATUS FOR A VOICE CONTROLLED FOREIGN LANGUAGE TRANSLATION DEVICE

(75) Inventor: Guangming Carl Shi, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/447,526

(22) Filed: Nov. 23, 1999

(51) Int. Cl.⁷ .............................................. G10L 15/22
(52) U.S. Cl. ...................................... 704/277; 704/275
(58) Field of Search ................................. 704/277, 256, 704/257, 251, 270, 2, 3, 4, 9, 255, 275, 260, 235, 258, 246

(56) References Cited

U.S. PATENT DOCUMENTS

| | | | |
|---|---|---|---|
| 4,525,793 A | | 7/1985 | Stackhouse ............... 364/513.5 |
| 4,916,730 A | * | 4/1990 | Hashimoto .................. 364/900 |
| 4,984,177 A | * | 1/1991 | Rondel et al. ................. 381/52 |
| 5,384,701 A | | 1/1995 | Stentiford et al. ..... 364/419.03 |
| 6,347,300 B1 | * | 2/2002 | Minematsu .................. 704/270 |

FOREIGN PATENT DOCUMENTS

| | | | |
|---|---|---|---|
| EP | 0472193 | 2/1992 | ............. G10L/3/00 |
| EP | 0751467 | 1/1997 | ............ G06F/17/28 |
| EP | 0 751 467 A2 * | 1/1997 | ............ G06F/17/18 |
| EP | 0774729 | 5/1997 | ............. G06K/9/00 |
| EP | 0953918 | 11/1999 | ............ G06F/17/28 |
| WO | 9905839 | 2/1999 | ............. H04M/1/27 |
| WO | 9946762 | 9/1999 | .............. G10L/3/00 |

* cited by examiner

*Primary Examiner*—Richemond Dorvil
(74) *Attorney, Agent, or Firm*—Philip R. Wadsworth; Charles D. Brown; Howard H. Seo

(57) ABSTRACT

A voice controlled foreign language translator implemented in a device such that a user can speak a phrase in the user's native language and the translator will repeat the phrase in the foreign language. The user is provided a collection of predetermined foreign phrases. The phrases are stored in a device memory. Each individual phrase is accessible by the user. If speaker dependent voice recognition is implemented, the user must train the device to correlate the native language phrase with the foreign language phrase prior to using the translation feature. Voice recognition software operating on a digital processor within the device processes the user voice input. Once the user has trained the device it can be used in translation mode. In translation mode the user speaks one of the pre-trained native language phrases and the device, using voice recognition, outputs the corresponding foreign phrase. The output is typically played on a loudspeaker in the device.

13 Claims, 10 Drawing Sheets ns and
telecommunication devices. More particularly, the present
METHOD AND APPARATUS FOR A VOICE CONTROLLED FOREIGN LANGUAGE TRANSLATION DEVICE

BACKGROUND OF THE INVENTION

I. Field of the Invention

The present invention relates to communications and telecommunication devices. More particularly, the present invention relates to a novel and improved method and apparatus for a voice controlled device capable of translating native language phrases into a predetermined set of foreign language phrases.

II. Description of the Related Art

For an individual travelling in a foreign country the inability to effectively communicate in the local language can present serious difficulties. Of course, the best solution is for the individual to become proficient in the foreign language. However, this is not always possible. Individuals that are on vacation travel may often spend very little time in a foreign country. It is unreasonable to expect a vacation traveler to become proficient in one or several foreign languages for the limited purpose of a one time vacation trip. Similarly, a business traveler may be required on short notice to travel to foreign locations for limited amounts of time.

The foreign traveler has a limited number of solutions available that will help to bridge the communication gap. The traveler can attempt to learn key phrases prior to the trip. This solution is extremely helpful provided the traveler is able to recall the phrases at the required moment in time. The communication difficulties persist when the traveler is unable to recall the proper phrase. Problems with recall are further compounded when the traveler passes through multiple regions, each requiring a different foreign language.

Another popular solution bridging the communication gap is the foreign language phrase book. When a foreign phrase is required the traveler looks in the phrase book for the translation then speaks the phrase. The problem inherent in this solution is the time required to look up a particular phrase. However, the time delay in looking up a phrase is preferable to the inability to communicate. The phrase book is a likely companion solution to learning a predetermined small set of foreign phrases.

The advancement in digital processing power makes it possible to integrate highly complicated tasks into portable devices. The development of the wireless phone is a demonstration of the effective integration of advanced processing power into a user friendly portable device.

Modern wireless phones integrate numerous complicated signal processing tasks within a form factor small enough to be carried in a shirt pocket. Numerous features are implemented into wireless phones for the user's convenience. The features are accessed by using the phone keypad in conjunction with the display to navigate through a series of menu options. The different menus provide a convenient hierarchical method of categorizing the various features. Some wireless phones implement a voice recognition feature. Voice recognition allows the user to operate the phone using a predetermined set of voice commands. This allows the user to activate features without manually navigating menus. However, the phone is also configured such that the menus can be navigated using voice commands. Features accessible using voice commands include called number dialing, number storage in an electronic phone book, number retrieval from an electronic phone book based upon a name, and incoming call answering.

Two forms of voice recognition exist. The two forms are speaker dependent voice recognition and speaker independent voice recognition. Speaker independent voice recognition requires more processing time and requires a larger voice database. Speaker dependent voice recognition minimizes the processing time and voice database size by comparing voice inputs with the speaker's voice samples. In speaker dependent voice recognition the user must enter a training menu and run a training routine prior to using the voice recognition function. In the training routine the user is required to voice a predetermined command vocabulary to allow the voice recognition feature to learn to recognize user voice commands. Once the predetermined vocabulary is trained, the user is able to utilize the voice recognition feature.

The voice recognition feature of the wireless phone allows for useful possibilities beyond phone menu navigation. However, the capabilities of voice recognition and signal processing are not limitless.

What is required is a foreign phrase translator that is portable and can provide nearly instantaneous access and translation of native language phrases into foreign language phrases. This device could serve as a back up solution to learning a small set of foreign language phrases or could provide a primary communication solution to the traveler that knows no foreign language phrases.

SUMMARY OF THE INVENTION

The present invention is a novel and improved method and apparatus for translating a spoken native language phrase into a foreign language phrase. When configured, the device plays a foreign language phrase in response to a native language phrase spoken by the user.

The user is provided a collection of predetermined foreign language phrases. The collection may be a set of phrases in a single foreign language or may consist of several sets of foreign language phrases. The collection may be grouped according to foreign language or alternatively may be grouped according to meaning. The collection may be provided to the user already implemented in the translation device or may be provided to the user in some form of non-volatile memory. If the collection of foreign language phrases is provided to the user in the form of non-volatile memory, such as a diskette or CDROM, the user is instructed on how to load the desired foreign phrases into the translation device.

Once the desired foreign language phrases and corresponding native language equivalents are loaded into the translation device the user is able to access each phrase by scrolling through a menu on the device user interface. In speaker dependent voice recognition the user must train the voice recognition feature of the device prior to using it as a translator. The user must initiate a training routine where the user says the native language phrase and assigns that voiced native language phrase to a specific foreign language phrase. The voice recognition training routine typically requires the user to repeat the native language phrase at least once.

The set of foreign language phrases saved in memory is expandable. The user can append the set of foreign language phrases with phrases loaded from non-volatile memory or, alternatively, can enter new foreign phrases and their corresponding native language translations using the device user interface.

The user is able to access the translation feature after the phrase has been trained. The voice recognition feature must first be active. Then the user is able to speak the native language phrase and have the device repeat the foreign language phrase.

In the preferred embodiment a wireless phone is used as the translation device. Modern wireless phones are small enough to be convenient to carry at all times. Some wireless phones have voice recognition capabilities built into the phone. Voice recognition is used to allow a user to dial a number, retrieve phone book entries, store phone book entries, and navigate phone menus using voice commands. A translator feature can be added to these wireless phones without a significant increase in the amount of hardware within the phone. Some wireless phones may require additional memory to store the native language phrases and foreign language phrases while other wireless phones already have sufficient memory capabilities and only require a software update. Other wireless phones may require a more powerful loudspeaker than is currently available in the phone. The phone requires the more powerful loudspeaker to provide a louder audible output.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In the preferred embodiment the translation feature is implemented into a wireless phone containing voice recognition capabilities. The user accesses the voice recognition features through a small, predetermined, vocabulary set. The voice recognition feature must be activated prior to using the translation feature.

Figure 1A:
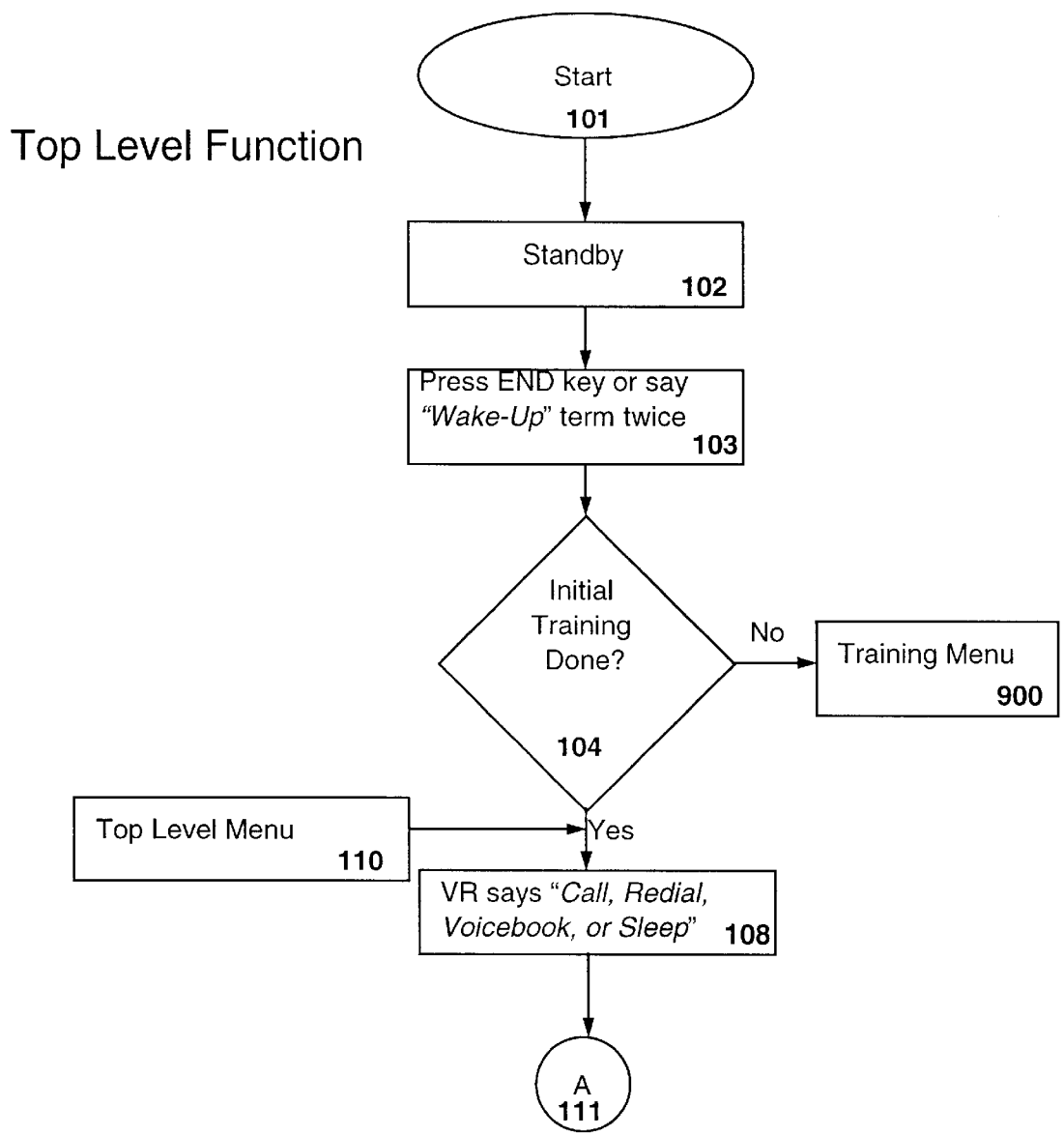
FIGS. 1E–1F are flow charts of the user interface implementing the translation routine.

Referring to FIG. 1A a user starts 101 the user interface by either first powering on the phone or by ending an active phone call. Following either one of those user actions the phone enters a standby state 102. At the standby state 102 the phone is able to accept incoming phone calls or paging messages and is able to initiate phone calls. At the standby state 102 the user is also able to navigate through the user interface menus. The menus are typically displayed on the phone display with menu options often providing access to additional menus. In phones with a voice recognition feature the user is also able to initiate the voice recognition routine at the standby state 102. Initiation of the voice recognition routine is illustrated in state 103. The user is able to initiate the voice recognition feature by pressing a predetermined button on the keypad or by saying and repeating a predetermined command term. In state 103 pressing the "END" button on the keypad or saying the term "Wake-Up" twice will initiate the voice recognition routine. It should be noted that the first time the voice recognition feature is initialized the user must access the voice recognition feature using the keypad since the voice recognition software has not yet been trained to recognize the user voice commands.

After the user has accessed the voice recognition feature the routine advances to state 104 where the voice recognition routine checks to see if initial training has been done. Training is first verified because the voice recognition software is not able to recognize user commands that have not been trained. If initial training has not yet been accomplished the voice recognition software will be unable to recognize any user commands. Therefore, if initial training has not been accomplished the routine proceeds to the training menu 900.

However, if initial training has been accomplished the routine proceeds to state 108. At state 108 the voice recognition routine prompts the user by saying "Call, Redial, Voicebook, or Sleep." Each of the key terms used in the prompt, Call, Redial, Voicebook, and Sleep, are available user voice commands that correspond to voice controlled functions. However, the prompt only mentions the commonly used commands. Other voice commands are available to the user. Once the routine has provided the audible prompt to the user the routine proceeds to point A 111. Point A 111 serves only to link the flow chart of FIG. 1A to the flow chart of FIG. 1B. The point has no functionality within the actual voice recognition routine.

Figure 1B:
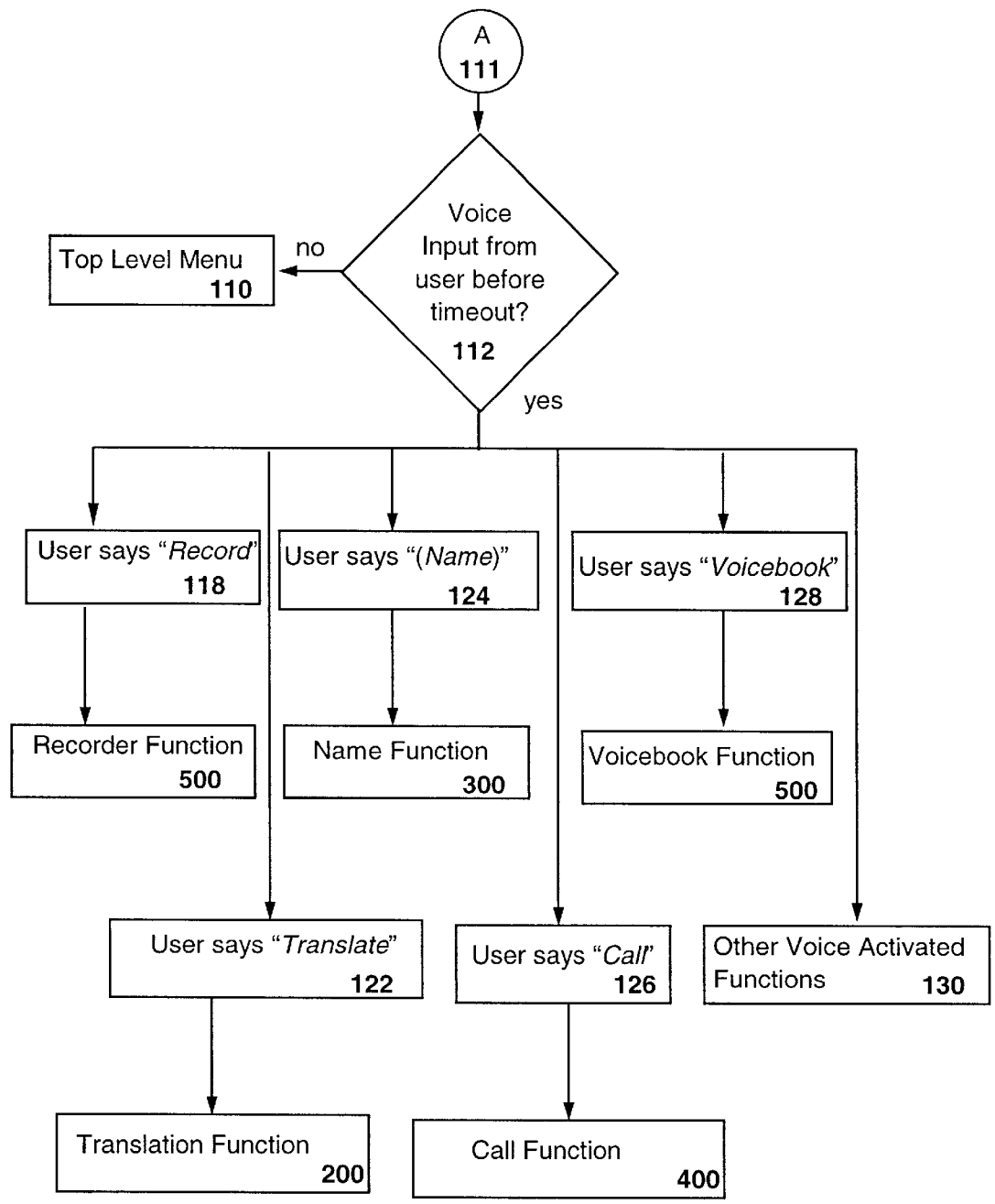

Continuing in FIG. 1B from point A 111, the routine advances to state 112 where the routine checks to see if there is any user voice input prior to a timeout. If the routine times out prior to user voice input the routine routes the user to state 110 which returns the user back to the point in FIG. 1A where the routine prompts the user for voice input. However, if voice input is detected, the contents of the voice command are analyzed.

Voice recognition routines rely on the ability to correlate user voice commands to words within a previously trained vocabulary set. Voice input matches a previously trained vocabulary set if the correlation exceeds a predetermined threshold. One of ordinary skill in the voice recognition art is able to determine the specific details of matching voice input with a previously trained vocabulary set. The field of voice recognition is not the basis of this invention, therefore the process of voice recognition is not detailed.

When user voice input is required the voice recognition routine utilizes a function which verifies a valid voice command. Additionally, the function may prompt the user to repeat the voice input if the command is not understood. The voice command verification function would typically be present in any state, such as state 112, which requires user voice input. However, this function is not depicted in FIGS. 1A–1E. The presence of a voice command verification function does not alter the operation of the invention and therefore is not shown.

The user can enter one of several voice commands while in state 112. If the user says "Translate", state 122, the voice recognition routine advances to the translation function, state 200. The translation function 200 is shown in detail in FIG. 1C.

If at state 112 the user says "Record", state 118, the voice recognition routine advances to the recorder function 500. The recorder function 500 allows the user to manually enter new foreign language phrases that are not within the foreign phrase set supplied by the device manufacturer. The recorder function 500 is shown in detail in FIG. 1F.

All of the other commands featured in FIG. 1B illustrate phone functions that are accessible using voice commands. If at state 112 the user says a name 124 that has been previously trained and stored in memory, the voice recognition function proceeds to a name function 300. The name function 300 allows the user to initiate a phone call to a party by saying a previously saved name of the called party.

At state 112 if the user says "Call" 126 the voice recognition routine proceeds to a call function 400. The call function 400 is much like the name function 300 in that it allows the user to initiate calls using voice commands. However, in the call function 400 the user can initiate calls either by saying a previously saved name of a called party or by saying the individual digits that are to be dialed.

Not all user voice commands relate to call initiation. If the user, in state 112, says "Voicebook" 128 the voice recognition routine proceeds to the voicebook function 500. The voicebook function 500 allows the user the ability to save names and associated phone numbers in a voice phonebook using voice commands. The names in the voice phonebook are then accessible through voice commands. The stored names are the names that can be accessed using the name function 300 or the call function 400.

Additional voice commands may be available to the user at state 112. The additional functions that are activated upon the voice command are represented by state 130. Additional commands include the command to exit the voice recognition mode, the command that initiates a training function, and the command that initiates redial of the last number called.

Figure 1C:
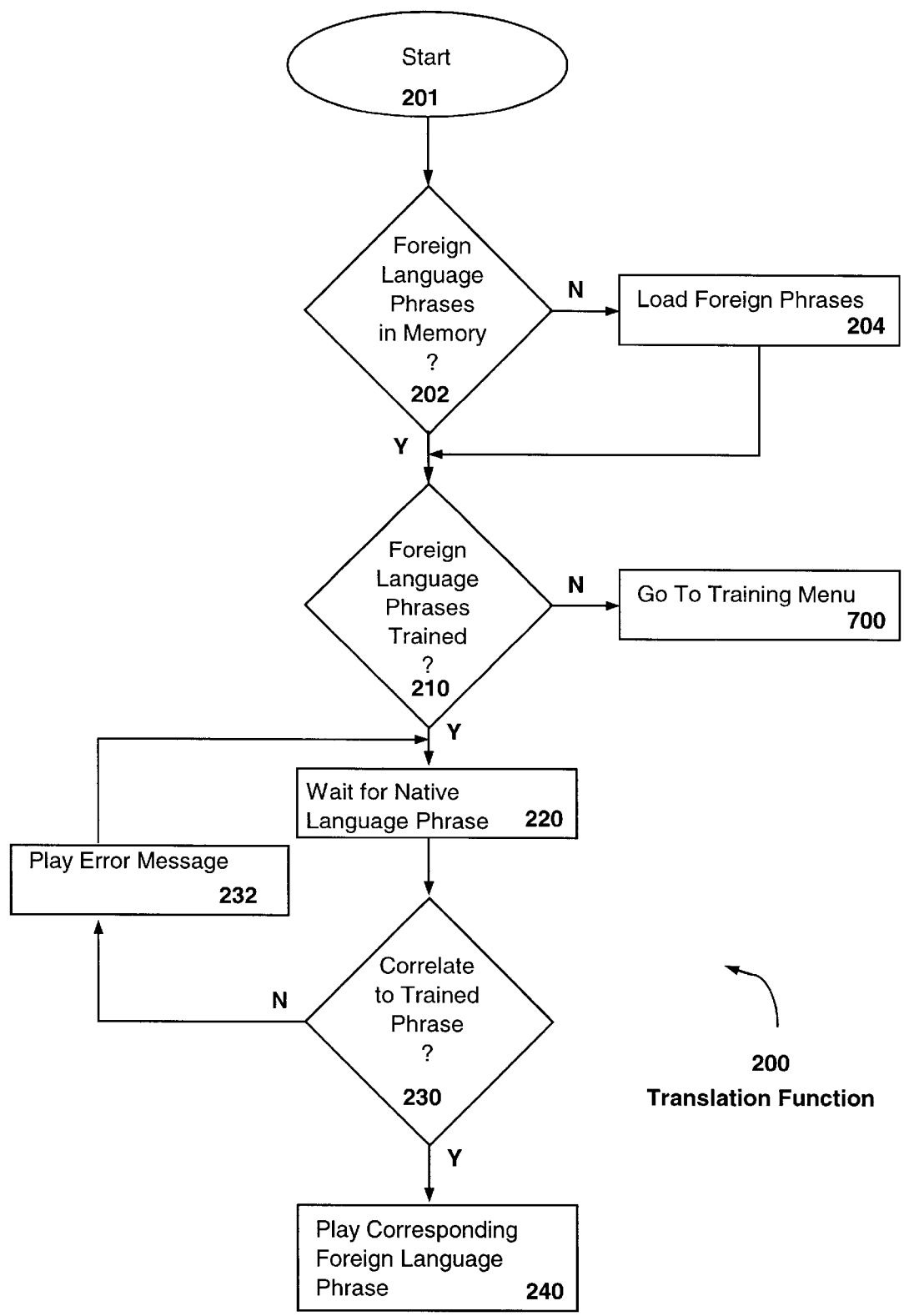

FIG. 1C shows a flow chart of the translation function 200 shown in FIG. 1B. When the user issues the voice command to initiate the translation function 200 the routine illustrated in FIG. 1C starts 201. The translation function 200 first checks to see if there are any foreign language phrases saved in memory, state 202. In devices where foreign language phrases are supplied to the user in the form of a CDROM or floppy disk the user is required to enter the desired set of foreign language phrases. This method is flexible since it allows many sets of foreign language phrases to be supplied to the user. The user then only needs to load the desired set of foreign language phrases. The hardware requirements of the device are minimized by not requiring the complete compilation of foreign language phrases to be permanently stored in the device.

If at state 202 the routine does not find any foreign language phrases presently in memory the routine proceeds to state 204 where the user is instructed to load foreign phrases. At this point the user is also given the opportunity to exit the voice recognition function (not shown).

Once the user has loaded foreign phrases into memory, or if the voice recognition routine detects foreign phrases already loaded into memory, the voice recognition routine proceeds to state 210 to check to see if the foreign language phrases have been trained. If the foreign language phrases have not yet been trained the voice recognition routine proceeds to the training menu 700. However, if the foreign language phrases have already been trained the voice recognition routine proceeds to state 220 where it waits for the user to say a native language phrase. State 220 may be allowed to persist indefinitely until cancelled by the user or the state may have a timeout associated with it.

Once the user says a native language phrase the voice recognition routine proceeds to state 230 to correlate the user phrase with previously trained phrases stored in memory. If the voice recognition routine is unable to correlate the user phrase with a previously trained phrase stored in memory the routine proceeds to state 232 where the phone plays an error message. The voice recognition routine then returns to state 220 to await the user voice input. The number of times the user is allowed to repeat a phrase may be controlled by the voice recognition routine. It may be preferable to allow the user an indefinite number of retries. If the number of retries is unbounded then user input will be allowed until a match is found or until the user decides to exit the translation function. Alternatively, the voice recognition routine may only allow a limited number of unsuccessful voice commands. If the number of retries is limited the translation function will terminate upon reaching the limit.

If at state 230 the user input correlates with a previously trained phrase the voice recognition function proceeds to state 240. In state 240 the voice recognition function plays the foreign language phrase corresponding to the previously trained phrase. The successful correlation of a user phrase with a previously trained phrase results in the phone playing a foreign language phrase. Alternatively, the voice recognition function can display the foreign language phrase on a display. Effectively, the phone translates the native language phrase input by the user into a foreign language phrase.

Figure 1D:
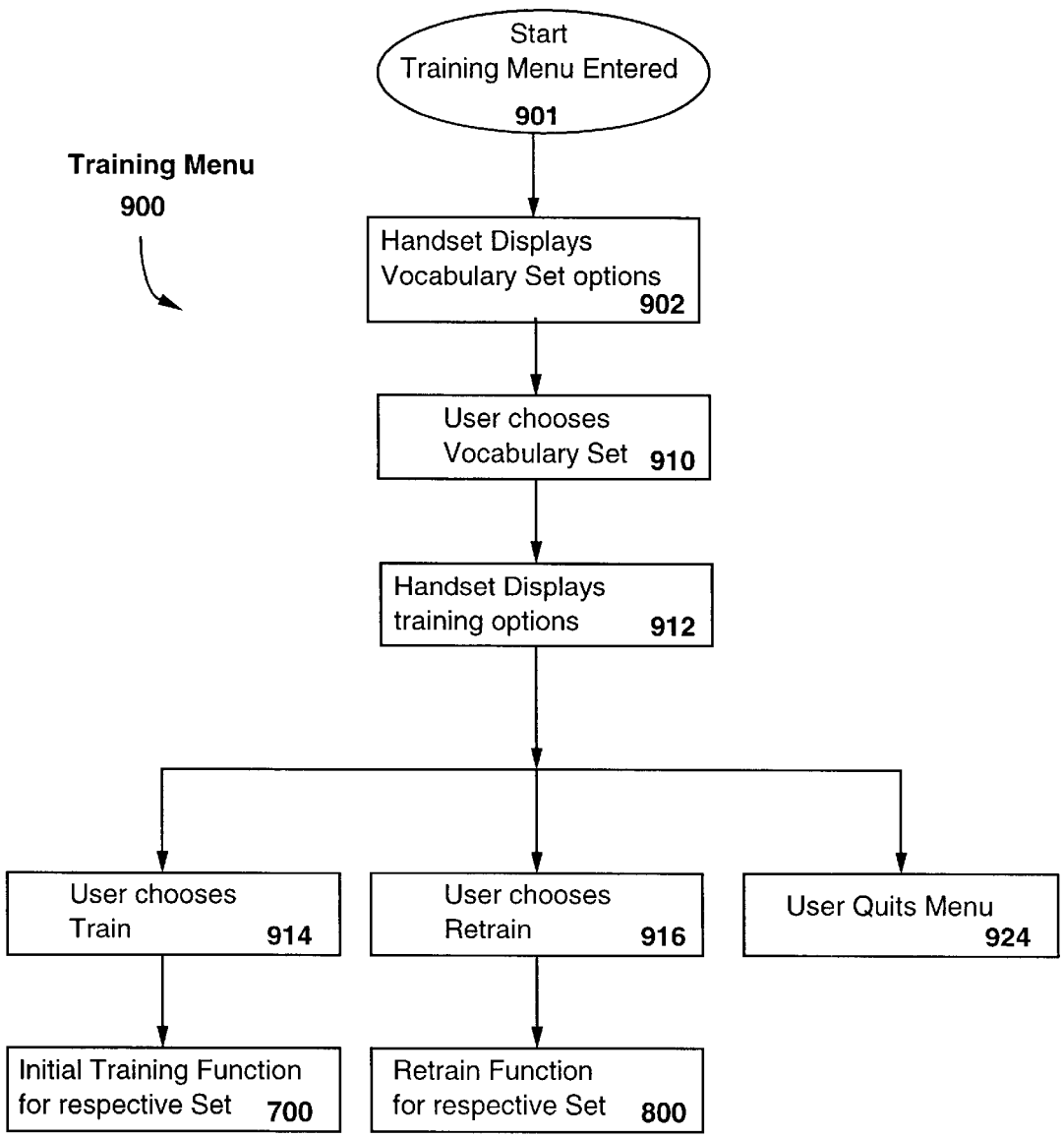

FIG. 1D is a block diagram of the training menu 900. The training menu 900 is accessible from the top level menu 110 or is automatically accessed if the user has never performed any voice training. When the training menu is started 901 the phone proceeds to state 902 where the phone displays the vocabulary set options. The vocabulary set options would typically include a vocabulary set corresponding to digits, a vocabulary set of command words, and a vocabulary set corresponding to the translation function. The phone then waits for the user to choose a vocabulary set to train. Once the user chooses a vocabulary set, state 910, the routine proceeds to state 912 where the phone displays the available training options corresponding to the chosen vocabulary set.

The user is provided the option of training a vocabulary set or retraining a vocabulary set. The training option is used if the user has never attempted to train the particular vocabulary set. The training option is also used if the user wishes to completely retrain all of the words in the vocabulary set. The retraining option is used if the user has previously trained the vocabulary set and wishes to retrain only a portion of the vocabulary. The user is also provided the option of quitting the training menu.

Figure 1E:
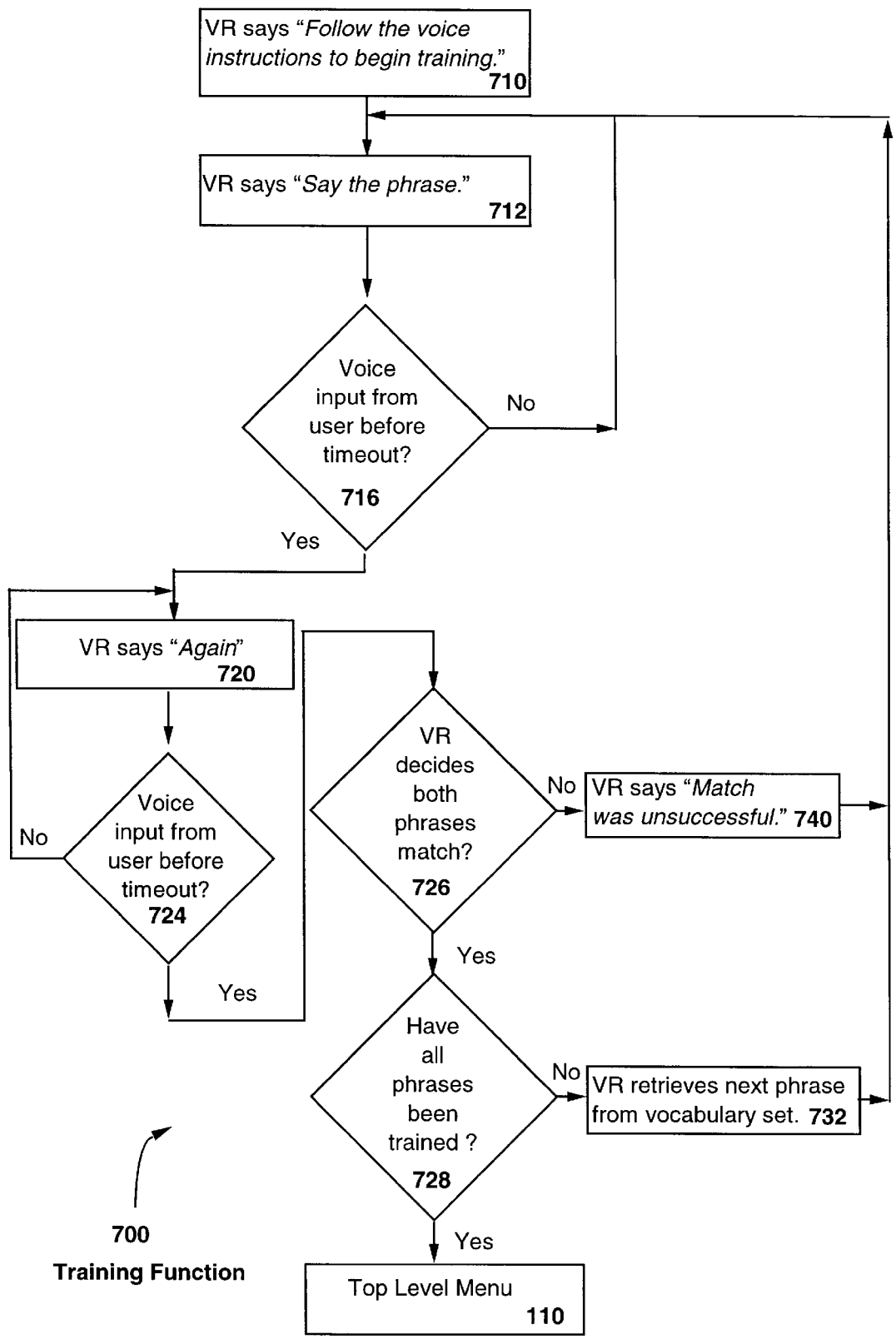
Figure 1F:
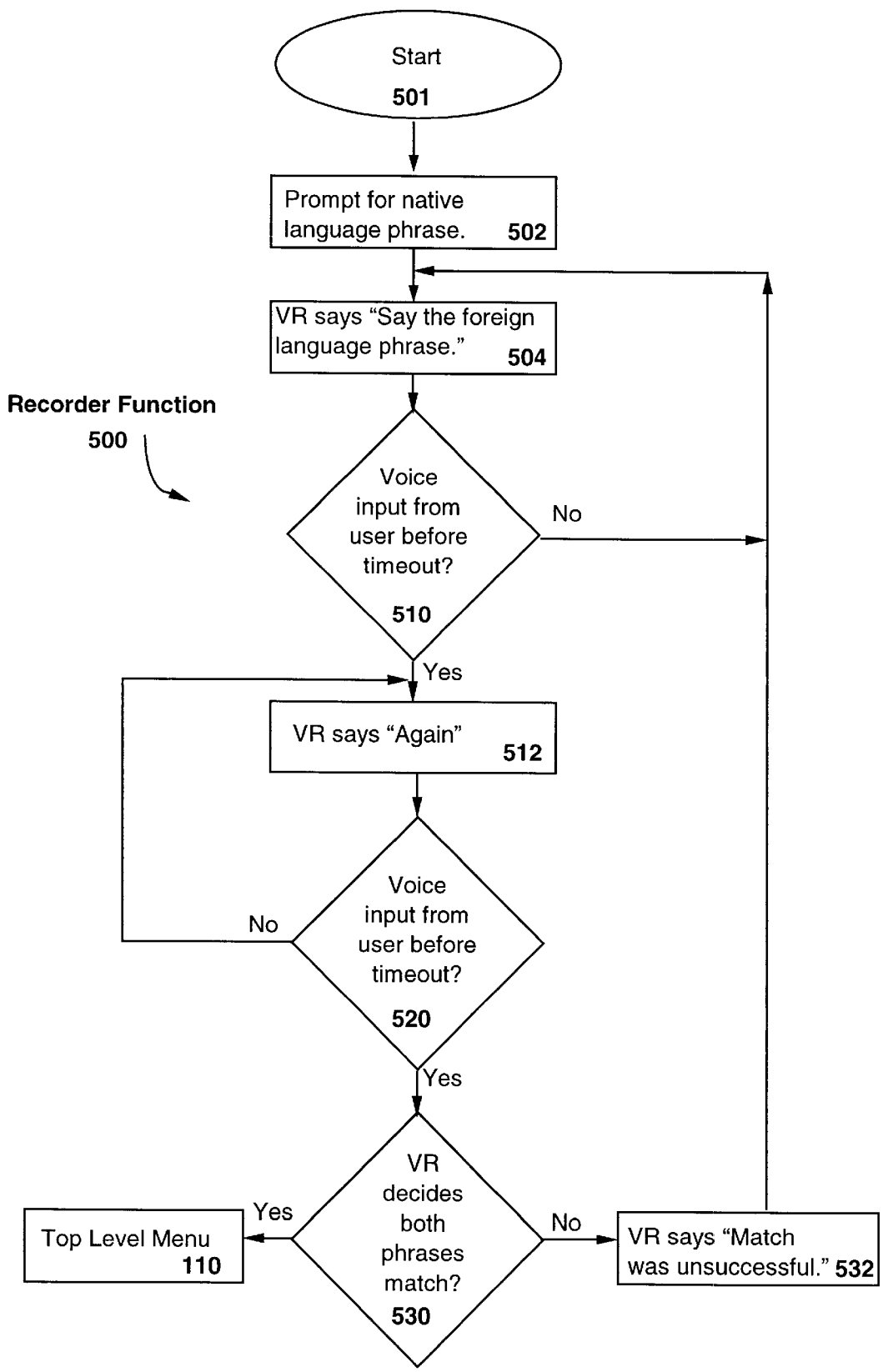

If the user chooses the train option 914 the routine proceeds to the initial training function for the chosen vocabulary set 700. FIG. 1E provides a detailed flow chart of the training function for the translation function.

If the user chooses the retrain option 916 the routine proceeds to the retrain function for the chosen vocabulary set 800. The retraining function is very similar to the initial training function except the retraining function allows the user to skip words in the vocabulary set that do not need to be retrained.

The final option provided the user is quitting the menu 924. If the user chooses to quit the menu 924 the routine can either return the user to the top level menu 110 or exit the voice recognition function.

FIG. 1E is a flow chart detailing the initial training function corresponding to the translation function. The initial training function begins at state 710 where the voice recognition routine (abbreviated VR) prompts the user by saying "Follow the voice instructions to begin training." The routine then proceeds to state 712 where the user is prompted to "Say the phrase (phrase)." The term (phrase) in the prompt represents the native language phrase that the user is presently training. The native language phrase corresponding to a foreign language phrase is loaded at the same time that the foreign phrase set is loaded into the phone. Alternatively, the phone display can show the foreign language phrase and the portion of the prompt stating the native language phrase can be eliminated. However, this alternate embodiment is not preferred since the user then must know the translation of the foreign language phrase in order to say the correct native language phrase. This could potentially result in erroneous pairing of native language phrases to foreign language phrases.

Once the voice recognition routine provides the user prompt the routine proceeds to state 716 to wait for user voice input. If the user does not respond prior to the timeout the routine returns to state 712 to repeat the user prompt. As in previous states where user input is required, state 716 allows a limited number of timeouts to occur before terminating the function. If the user provides voice input at state 716 the voice recognition function proceeds to state 720 and says "Again" to prompt the user to repeat the phrase.

The voice recognition routine then proceeds to state 724 to wait for voice input from the user prior to a timeout. If timeout occurs prior to user voice input the routine returns to state 720 where the prompt is repeated. As before, the user is only given a limited number of opportunities to provide input before the routine terminates. If the user provides voice input prior to timeout, the routine proceeds to state 726 and decides whether both user inputs match.

If the second user voice input does not match the first user voice input the routine proceeds to state 740 where the voice recognition function tells the user "Match was unsuccessful." There are a variety of reasons for an unsuccessful match. If the user does not repeat the phrase in the same way it was said the first time there would not be a match. Also if the user does not provide the complete phrase within the allowable input window a portion of the input is not captured. This results in an unsuccessful match for the two user inputs. Since the root cause of the unsuccessful match cannot be determined, the user must train the phrase again. The routine returns to state 712 to repeat the training of the current phrase.

If the voice recognition routine determines both user inputs match, the phrase is saved in memory and the routine proceeds to state 728. In state 728 the voice recognition routine checks to see if all phrases have been trained. If not all phrases have been trained the routine proceeds to state 732 and retrieves the next phrase from the vocabulary set. The routine then returns to state 712 to prompt the user to train the phrase.

State 728 routes the routine back to the top level menu 110 once all phrases have been trained. The user is then able to access the translation function.

The recorder function 500 allows the user to enter foreign language phrases to the set of foreign language phrases supplied by the device manufacturer. Once the recorder function 500 is started 501, the routine proceeds to state 502 where the routine prompts the user for a native language phrase. The prompt can be an audio prompt played to the user, a visual prompt shown on the device display, or a combination of the two. The user will be required to enter the native language phrase. The native language phrase is entered using the keypad. This allows the user to catalog the native language phrase along with the predetermined native language phrases supplied by the device manufacturer. Alternatively, the user is prompted to say the native language phrase and the user voice input is saved in the device. Once the user has entered the native language phrase the routine proceeds to state 504 where the routine prompts the user by saying, "Say the foreign language phrase." The routine then advances to state 510 to wait for the user input. If there is no user input prior to a timeout period the routine returns to state 504 to again prompt the user to say the foreign phrase. If the user provides a foreign language phrase before the timeout the routine advances to state 512 where the routine prompts the user to repeat the foreign language phrase by saying, "Again." The routine then proceeds to state 520 where the routine waits for the user input. If the user does not provide any input prior to a timeout the routine returns to state 512 to prompt the user to repeat the foreign language phrase. Although not shown in the flow chart, the routine will typically only allow input timeouts to occur twice before exiting the routine. If the user repeats the foreign language phrase prior to the timeout the routine proceeds to state 530 to check to see if both utterances of the foreign language phrase match. Although the routine will not be using voice recognition to match user input to the foreign language phrase the routine matches the two utterances to ensure a consistent input. One disadvantage with the user recorded foreign language phrases is the pronunciation of the stored foreign language phrase. The manufacturer supplied foreign language phrases are correctly spoken and definitely correspond to the native language phrases. In contrast, a user entered foreign language phrase may suffer from a user's accent. In the worst case scenario the foreign language phrase entered by the user may not correspond to the native language phrase believed by the user to be the translation.

If the routine decides that the two foreign language phrases spoken by the user do not match, the routine returns to state 504 to again prompt the user to say the foreign language phrase. Once the routine determines that the two utterances of the foreign language phrase match, the routine returns to the Top Level Menu, state 110. Like any of the manufacturer supplied foreign language phrases, the user must train the device prior to using the new foreign language phrase.

Figure 2:
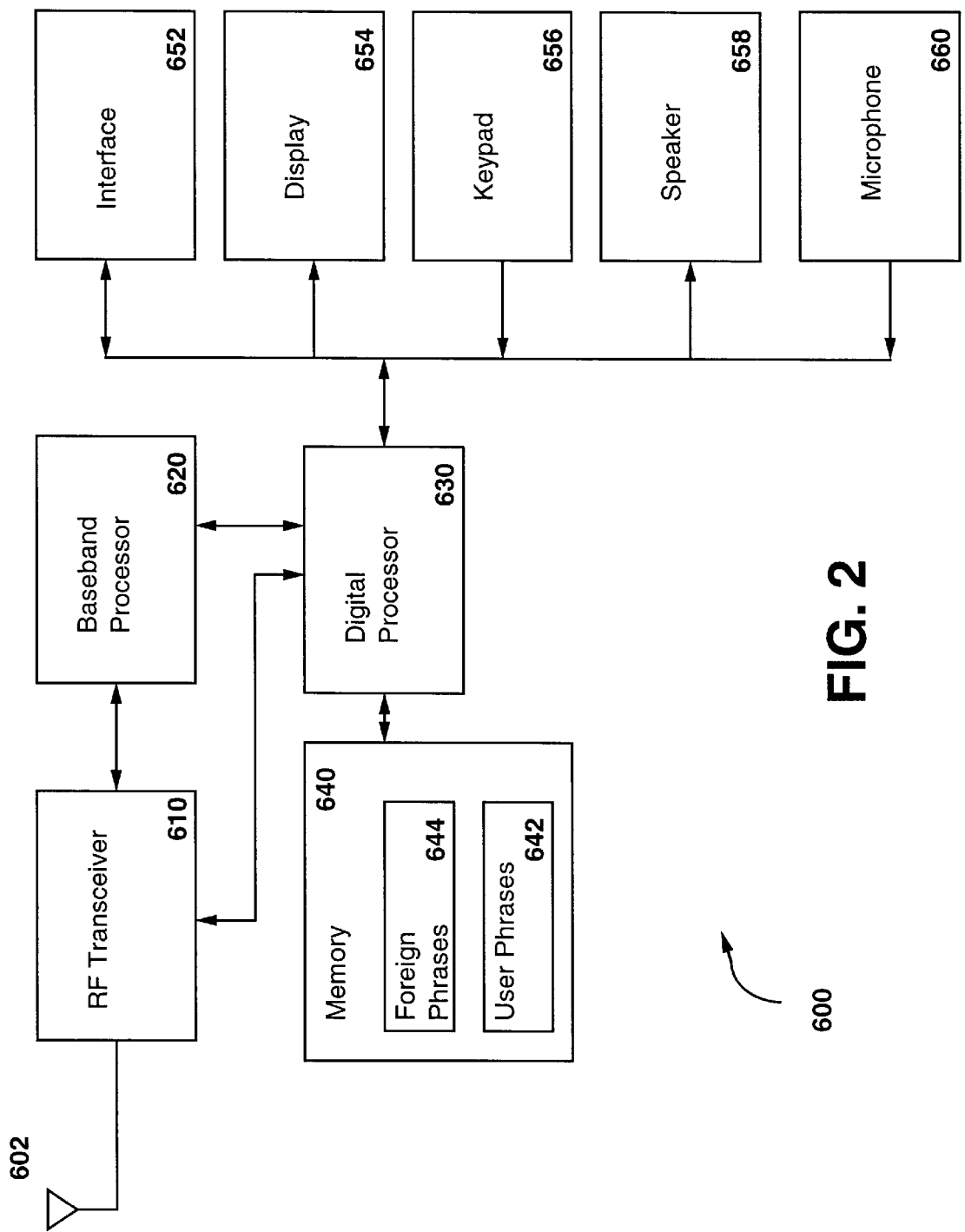
FIG. 2 is a block diagram of a wireless phone implementation of the invention.

The hardware required to implement the preferred embodiment is illustrated in the block diagram of FIG. 2. All of the elements to implement the preferred embodiment are already present within some existing wireless phones. FIG. 2 illustrates a block diagram of a wireless phone 600 implementing the preferred embodiment.

An antenna 602 serves as the transition between the wireless phone 600 hardware and electromagnetic radiation. The antenna 602 receives electromagnetic radiation and transfers the signal to the RF transceiver 610. Similarly, the RF transceiver 610 provides transmit signals to the antenna 602 to be broadcast to a base station.

In the receive signal path the RF transceiver 610 filters and amplifies the received signal. The received signal is then downconverted to a baseband signal. This baseband signal is provided to the baseband processor 620. A digital processor 630 works in conjunction with the baseband processor 620 to extract and format the information in the received signal. The digital processor then provides the extracted and formatted information to the appropriate hardware. The digital processor 630 processes incoming call alerts by retrieving a predetermined ringer sound from memory 640 and playing it on the ringer. Textual information received by the phone is shown on the phone display 654. Voice signals are sent to a speaker 658 to be played to the user. Other information is sent to its appropriate interface device 652.

In the transmit path, user input is received by the phone through the keypad 656 or interface device such as a microphone 660. The digital processor 630 conditions and formats the input signals in conjunction with the baseband processor 620. The baseband signals are then provided to the RF transceiver 610 where the baseband signals are upconverted to the transmit frequency and broadcast through the antenna 602.

Memory 640 within the phone holds the operating software of the phone. The user interface represents one portion of the operating software. The voice recognition algorithm is also stored as software in memory 640 in phones that provide voice recognition as an optional user interface. In one embodiment of the invention a predetermined set of foreign language phrases are stored in a portion of memory 644. Phone memory 640 may be composed of several memory chips. If multiple memory chips are used for phone memory 640, the foreign language phrases are stored in a first memory device.

In another embodiment several sets of foreign language phrases are provided to the user on some type of nonvolatile memory format such as floppy disks or CDROM. The sets are segregated according to the foreign language. The user then chooses one foreign language phrase set and downloads the information to the phone using a personal computer linked to the phone through a data cable. The foreign language phrases are then saved within phone memory 644. The second embodiment has the advantage of allowing the user the ability to pick which foreign language phrase will be loaded into the phone. The disadvantage is the additional effort and hardware required by the user.

Once foreign phrases have been loaded into phone memory 644 the user must train the voice recognition routine to recognize the native language phrase. The user cannot access the translation feature until voice recognition training has been accomplished. The details of the voice recognition training routine are provided above in FIG. 1. During voice recognition training the phone saves the user's native language voice input in another portion of memory 642. Where the phone memory 640 is composed of multiple memory chips, the native language phrases are saved in a second memory device. Each saved native language phrase corresponds to one of the previously saved foreign language phrases.

The user is able to access the translation feature once voice recognition training has been accomplished. To access the translation feature the user first accesses voice recognition capabilities within the phone. This is accomplished by either pressing a predetermined key sequence on the keypad 656 or by saying a previously trained voice command. User voice commands are input to the phone using the microphone 660 and are processed in the digital processor 630 running voice recognition software saved in memory 640. Once the voice recognition routine has been initiated the user must navigate to the translation feature. The user can accomplish this with a series of key presses or voice commands. Once the user has accessed the translation feature the foreign language phrases are accessible. The user provides a native language phrase voice input to the microphone 660 that is processed by the digital processor 630 using voice recognition software saved in phone memory 640. If the voice input correlates with a native language phrase saved in memory 642 the digital processor retrieves a resultant phrase to output to the user. Typically, the resultant phrase is the foreign language phrase from memory 644 that corresponds to the native language phrase. The digital processor retrieves the foreign language phrase and plays it on the speaker 658. In an alternate embodiment the resultant phrase is text of the foreign language phrase corresponding to the native language phrase. In this case, the text of the foreign language phrase is displayed on the phone display 654. The user says a native language phrase and the phone, using voice recognition, responds with the foreign language phrase. The phone effectively translates the native language phrase to a foreign language phrase.

Figure 3:
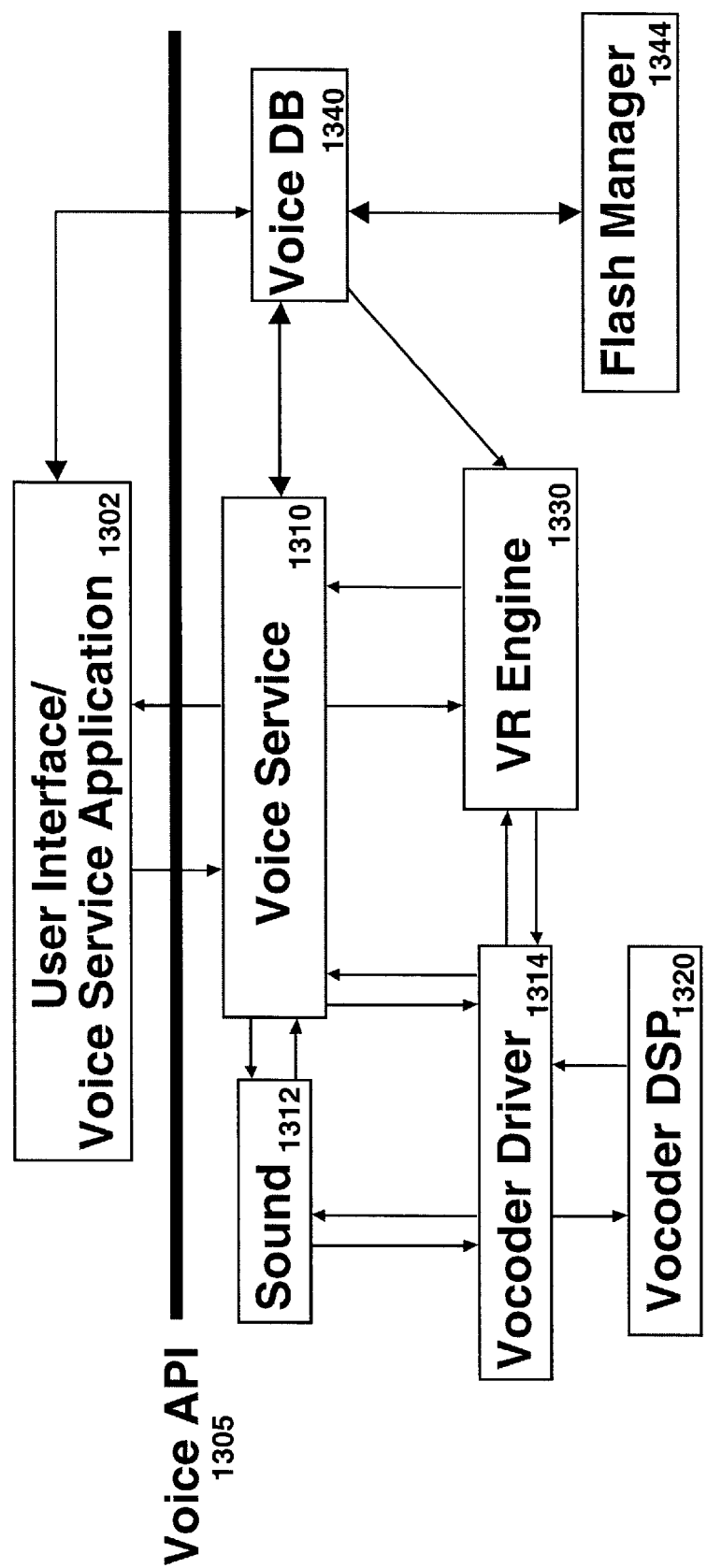
FIG. 3 is a block diagram of the voice recognition implementation in a device.

A more detailed block diagram of the voice recognition function is shown in FIG. 3. A user interface/voice service application 1302 is used to allow a convenient user interface to the voice service 1310. A voice Application Programming Interface (API) serves to link the user interface 1302 with the remainder of the voice recognition application. The voice service 1310 controls the distribution of voice recognition tasks. The voice service 1310 also oversees the playback, training, recognition and control functions associated with voice recognition. The voice database (DB) 1340 performs the control functions required when voice information needs to be either saved or received from memory. The memory manager 1344 performs the tasks associated with interfacing the actual memory hardware to the remaining software routines. A sound 1312 function is used to synthesize and play sounds required by the voice service. These sounds include tones, alerts, and the voice sounds that are retrieved from memory through the voice database 1340. The vocoder driver 1314 and vocoder DSP 1320 routines serve to format voice input signals and process them such that they can be utilized in the Voice Recognition engine 1330. They also format voice output data and play back the voice data through the speakers. The VR engine 1330 is the function that performs the actual voice recognition. The VR engine 1330 takes the voice input that has been processed in the vocoder DSP 1320 and compares it against voice templates that are retrieved from memory through the voice database 1340. Matches or rejections are indicated to the voice service 1310, which supervises the operation of the VR engine 1330.

Figure 4A:
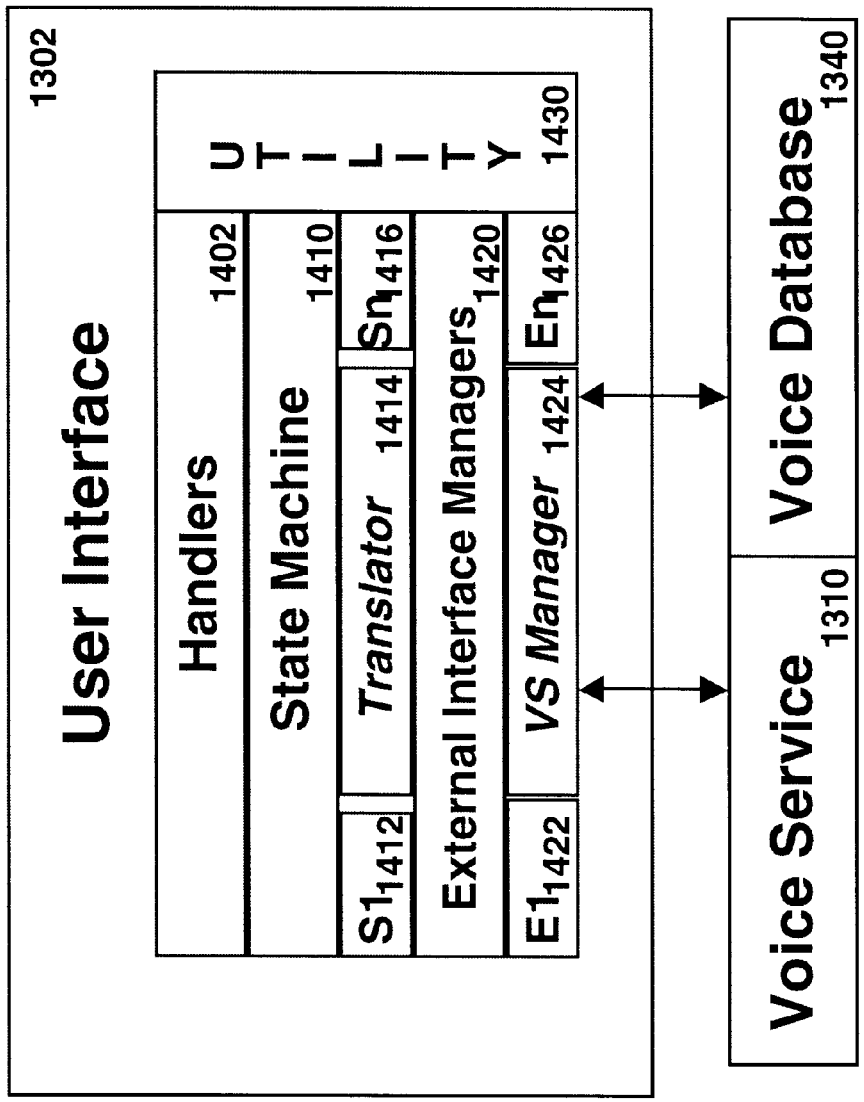
FIGS. 4A–4B are block diagrams of the device user interface and translator function.

The user interface 1302 is further detailed in FIG. 4A. The user interface 1302 is composed of a number of handlers to address the various user inputs and outputs that are required. For example a handler would be used to interface the keyboard to the application. Once the handlers 1402 have converted the user input to a suitable event, the event is routed to the appropriate state machine 1410. All of the functions within the phone can be characterized in the form of a state machine. The overall state machine 1410 that represents all tasks within a phone performed by software is composed of a number of individualized state machines S1 1412 through Sn 1416 that perform particular applications. One of the individualized state machines is the translator 1414. The translator 1414 state machine governs the flow of the translation user interface application.

Information that is processed in the state machine is conditioned in an external interface manager 1420 prior to being sent to the voice service 1310 or voice database 1340. In a structure analogous to the state machine 1410 the external interface manager 1420 is composed of a number of individual managers E1 1422 through En 1426 that manage the interfaces to applications. The Voice Service (VS) manager 1424 is used to interface between the translator 1414 state machine and the voice service 1310 or voice database 1340 applications.

Various utility 1430 applications are available to all the routines present in the user interface 1302. The utilities 1430 are not specific to any one routine and are shared throughout all the routines of the user interface 1302.

Figure 4B:
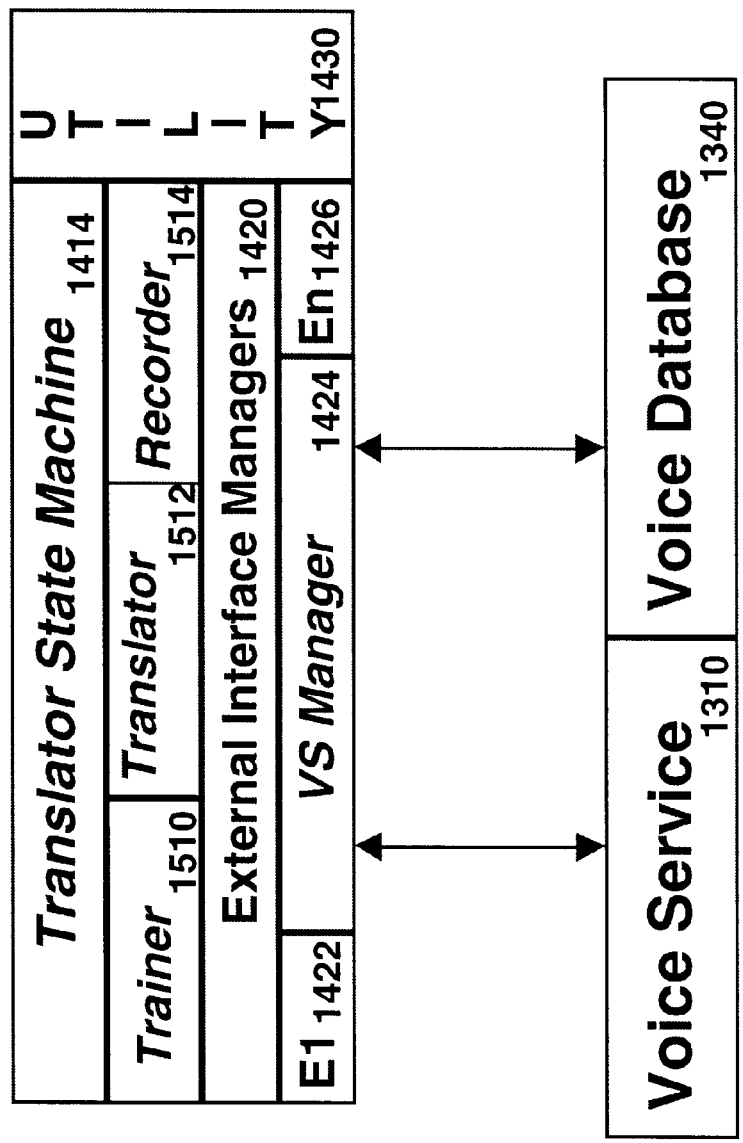

FIG. 4B is a block diagram detailing the translator state machine 1414. The translator state machine 1414 is composed of three smaller state machines, the trainer 1510, the translator 1512, and the recorder 1514. Each of the smaller state machines control the function of that portion of the translator state machine 1414. The relationship of the translator state machine 1414 to the external interface managers 1420, voice service 1310, and voice database 1340 are the same as shown in FIG. 4A.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method of translating a native language phrase to a foreign language phrase comprising:

saving in a first memory location a plurality of foreign language phrases;

saving in a second memory location a plurality of native language phrases with each native language phrase corresponding to one of the foreign language phrases;

receiving a voiced phrase;

correlating the voiced phrase with the native language phrases saved in the second memory location; and outputting a resultant foreign language phrase if the correlation between the voiced phrase and one of the native language phrases saved in the second memory location exceeds a predetermined threshold.

2. The method of claim 1 wherein the resultant foreign language phrase is outputted by playing the resultant phrase on a speaker.

3. The method of claim 1 wherein the resultant foreign language phrase is outputted by displaying the resultant phrase on a display.

4. The method of claim 1 wherein the first memory location and second memory location are located within distinct portions of a single memory device.

5. An apparatus for translating a native language phrase into a foreign language phrase comprising:

a first memory device storing a predetermined plurality of foreign language phrases;

a second memory device storing a plurality of native language phrases with each native language phrase corresponding to one of the foreign language phrases; and a voice recognition device which receives a voice input, compares the voice input to the native language phrases saved in the second memory, and outputs the foreign language phrase corresponding to the native language phrase if the correlation of the native language phrase with the voice input exceeds a predetermined threshold.

6. The apparatus of claim 5 wherein the foreign language phrase is outputted by playing the foreign language phrase on a speaker.

7. The apparatus of claim 5 wherein the foreign language phrase is outputted by displaying the foreign language phrase on a display.

8. The apparatus of claim 5 wherein the first memory device and the second memory device are distinct portions of the same device.

9. The apparatus of claim 5 wherein the native language phrases saved in the second memory device are native language translations of the foreign language phrases saved in the first memory device.

10. The apparatus of claim 5 wherein the native language phrases are user responses to prompts presented by a training routine.

11. The apparatus of claim 5 wherein the plurality of foreign language phrases represent a plurality of foreign languages.

12. The apparatus of claim 5 wherein the outputted foreign language phrase corresponds to one of a plurality of foreign languages.

13. The apparatus of claim 5 wherein a user is able to record and store within the first memory device additional foreign language phrases.

* * * * *